US008479264B2

(12) United States Patent
O'Connor et al.

(10) Patent No.: US 8,479,264 B2
(45) Date of Patent: Jul. 2, 2013

(54) ARCHITECTURE FOR VIRTUAL SECURITY MODULE

(75) Inventors: Dennis M. O'Connor, Chandler, AZ (US); John P. Brizek, Placerville, CA (US)

(73) Assignee: Micron Technology, Inc., Boise, ID (US)

( * ) Notice: Subject to any disclaimer, the term of this patent is extended or adjusted under 35 U.S.C. 154(b) by 830 days.

(21) Appl. No.: 11/529,987

(22) Filed: Sep. 29, 2006

(65) Prior Publication Data

US 2008/0104673 A1 May 1, 2008

(51) Int. Cl.
*G06F 21/00* (2006.01)
(52) U.S. Cl.
USPC ........ 726/4; 726/9; 726/15; 726/26; 713/100; 713/163; 713/164; 713/166; 713/189
(58) Field of Classification Search
USPC .............. 713/100, 163, 164, 166, 189; 726/4, 726/9, 15, 27
See application file for complete search history.

(56) References Cited

U.S. PATENT DOCUMENTS

| 7,409,487 | B1* | 8/2008 | Chen et al. ......................... 711/6 |
| 7,552,419 | B2* | 6/2009 | Zimmer et al. ............... 717/121 |
| 2002/0194389 | A1 | 12/2002 | Worley, Jr. et al. |
| 2005/0138370 | A1 | 6/2005 | Goud et al. |
| 2005/0138393 | A1 | 6/2005 | Challener et al. |
| 2005/0198633 | A1* | 9/2005 | Lantz et al. ........................ 718/1 |
| 2005/0210467 | A1* | 9/2005 | Zimmer et al. ..................... 718/1 |
| 2005/0246552 | A1* | 11/2005 | Bade et al. ..................... 713/193 |
| 2005/0278790 | A1 | 12/2005 | Birk et al. |
| 2006/0020781 | A1* | 1/2006 | Scarlata et al. ............... 713/100 |
| 2006/0026384 | A1* | 2/2006 | Brandt et al. .................. 711/209 |
| 2006/0212939 | A1* | 9/2006 | England et al. ................. 726/22 |
| 2006/0294331 | A1* | 12/2006 | Forrer et al. .................... 711/163 |
| 2007/0056033 | A1* | 3/2007 | Grawrock ....................... 726/15 |
| 2007/0079120 | A1* | 4/2007 | Bade et al. ..................... 713/166 |

FOREIGN PATENT DOCUMENTS

WO WO-2008042191 A2 4/2008

OTHER PUBLICATIONS

Berger et al., "vTPM: Virtualizing the Trusted Platform Module", Security '06: 15th USENIX Security Symposium, pp. 305-320, Feb. 14, 2006.*
Garfinkel et al., "Terra: A Virtual machine-Based Platform for Trusted Computing", Proceedings of 19th ACM Symposium on Operating System Principles, Oct. 19-2, 2003, 14 pages.*
PCT Search Report, mailed Mar. 12, 2008, pp. 1-3.
Written Opinion, mailed Mar. 12, 2008, pp. 1-4.
Berger et al., "vTPM: Virtualizing the Trusted Platform Module", IBM Research Report, RC23879(WO602-126), Feb. 14, 2006.
M. Pourzandi, "Setting Up Virtual Security Zones in a Linux Cluster", Linux Journal, Oct. 1, 2004.

(Continued)

*Primary Examiner* — Jeffrey Pwu
*Assistant Examiner* — Hee Song
(74) *Attorney, Agent, or Firm* — Schwegman, Lundberg & Woessner, P.A.

(57) ABSTRACT

A device supports the processing of multiple active applications in a processor through a mapping system that securely identifies and differentiates commands issued by clients. An entity selection signal is generated by the mapping system to signal the processor to process an algorithm and provide services for a specific client using the commands identified for that client and data permitted by a client tracking system for that client. Other data accesses and commands identified for other clients are restricted when processing the algorithm.

13 Claims, 3 Drawing Sheets

OTHER PUBLICATIONS

Garfinkel et al., "Terra: A Virtual Machine-Based Platform for Trusted Computing", Proceedings of 19th ACM Symposium on Operating System Principles, Oct. 19-22, 2003.

PCT International Preliminary Report on Patentability and Written Opinion of the ISA, International Application No. PCT/US2007/020797, mailed Apr. 9, 2009, 6 pgs.

"Trusted Computing Platform Alliance (TCPA)", *Trusted Computing Group, Inc., Main Specification*, 2003, 332 pages.

Alves, Tiago, et al., "TrustZone: Integrated Hardware and Software Security", *ARM*, Jul. 2004, pp. 1-12.

Stefan Berger, vTPM: Virtualizing the Trusted Platform Module, IBM Research Report, RC23879 (W0602-126), Feb. 14, 2006, 17 pages.

Official Action for counterpart Russian application No. Application No. 200911623/08 (022310), dated Jul. 13, 2010, 11 pages (including translation).

First Office Action from foreign counterpart China Patent Application No. 200780035702.1, mailed Jul. 30, 2010, pp. 18 (including translation).

Extended European Search Report from foreign counterpart European Patent Application No. 07838900.4 mailed Oct. 12, 2010, 4 pages.

Notice of Preliminary Rejection Office Action from foreign counterpart Korea Patent Application No. 10-2009-7004786, mailed Oct. 15, 2010, pp. 8 (including translation).

Office Action from foreign counterpart Russia Patent Application No. 2009116231, mailed Dec. 23, 2010, pp. 13 (including translation).

Notice of Non-Final Rejection Office Action from foreign counterpart Korean Patent Application No. 10-2009-7004786, mailed May 31, 2011, pp. 6 (including translation).

\* cited by examiner

ARCHITECTURE FOR VIRTUAL SECURITY MODULE

Connected mobile computing and wireless communication technologies used for business and commerce need to protect user data and secrets. The architecture may include security engines to perform digital signing and key wrapping operations, hash operations and random number generation, with hardware and supporting software providing encryption and decryption capabilities to ensure data privacy and enhanced security.

The architecture in these systems restricts the use of secrets so that only authorized applications use particular secrets, but currently every command that uses secrets go through a cryptographic authorization check. There is a need for a mechanism to support multiple active applications that execute simultaneously that removes the need for checking authorization with every command.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
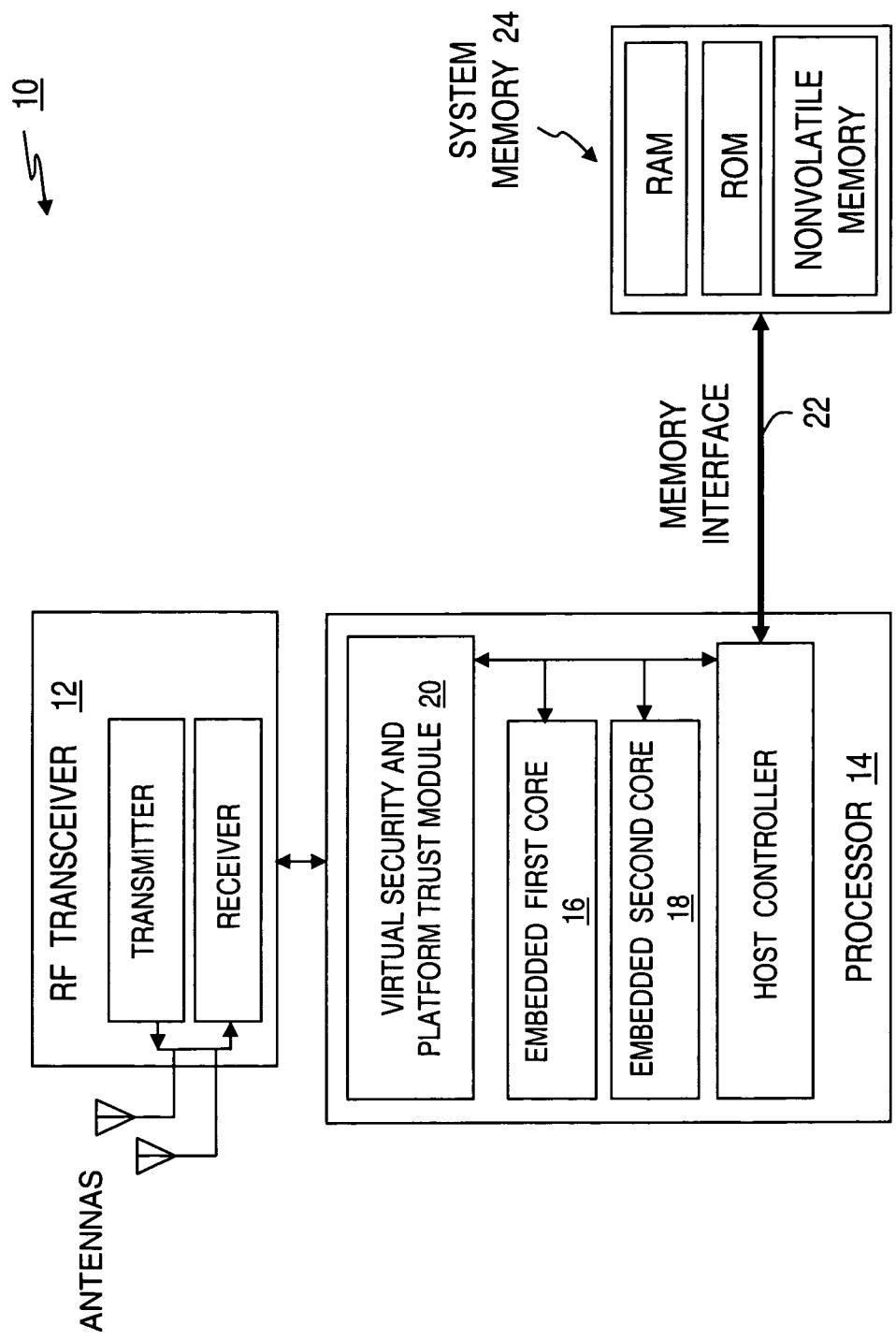
FIG. 1 is a diagram for an embodiment of a wireless device that illustrates a virtual security and platform trust module in support of multiple active applications that execute simultaneously in accordance with the present invention.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

As shown in FIG. 1, embodiments of the present invention may be illustrated in a device 10 that includes a radio to allow communication in an RF/location space with other devices. Accordingly, device 10 may be a communications device such as a smart phone that possesses a standardized operating system and is able to multitask between various applications and operate in a wireless network, but it should be understood that the present invention may be incorporated in devices other than wireless devices.

The figure illustrates a transceiver 12 that both receives and transmits a modulated signal from one or more antenna. A processor 14 receives the frequency down-converted, filtered signal that is converted to a baseband, digital signal. Processor 14, in general, processes algorithm functions that fetch instructions, generate decodes, find operands, and perform appropriate actions, then stores results. Processor 14 may use multiple cores 16 and 18 to calculate both baseband and applications processing functions where processing workloads may be shared across the cores. Processor 14 may transfer data through a memory interface 22 to a system memory 24 that may include a combination of memories such as a Random Access Memory (RAM), a Read Only Memory (ROM) and a nonvolatile memory, although neither the type nor variety of memories included in system memory 24 is a limitation of the present invention.

Device 10 employs a virtual security and platform trust module 20 that includes hardware configured to perform cryptographic functions and software to protect secrets from attackers. In general, module 20 may create, store and manage cryptographic keys; perform digital signature operations and anchor chain of trust for keys and the digital certificates. Thus, module 20 provides various services to secure files and folders and secure storage and management of user information, usernames, passwords and personal information.

Figure 2:
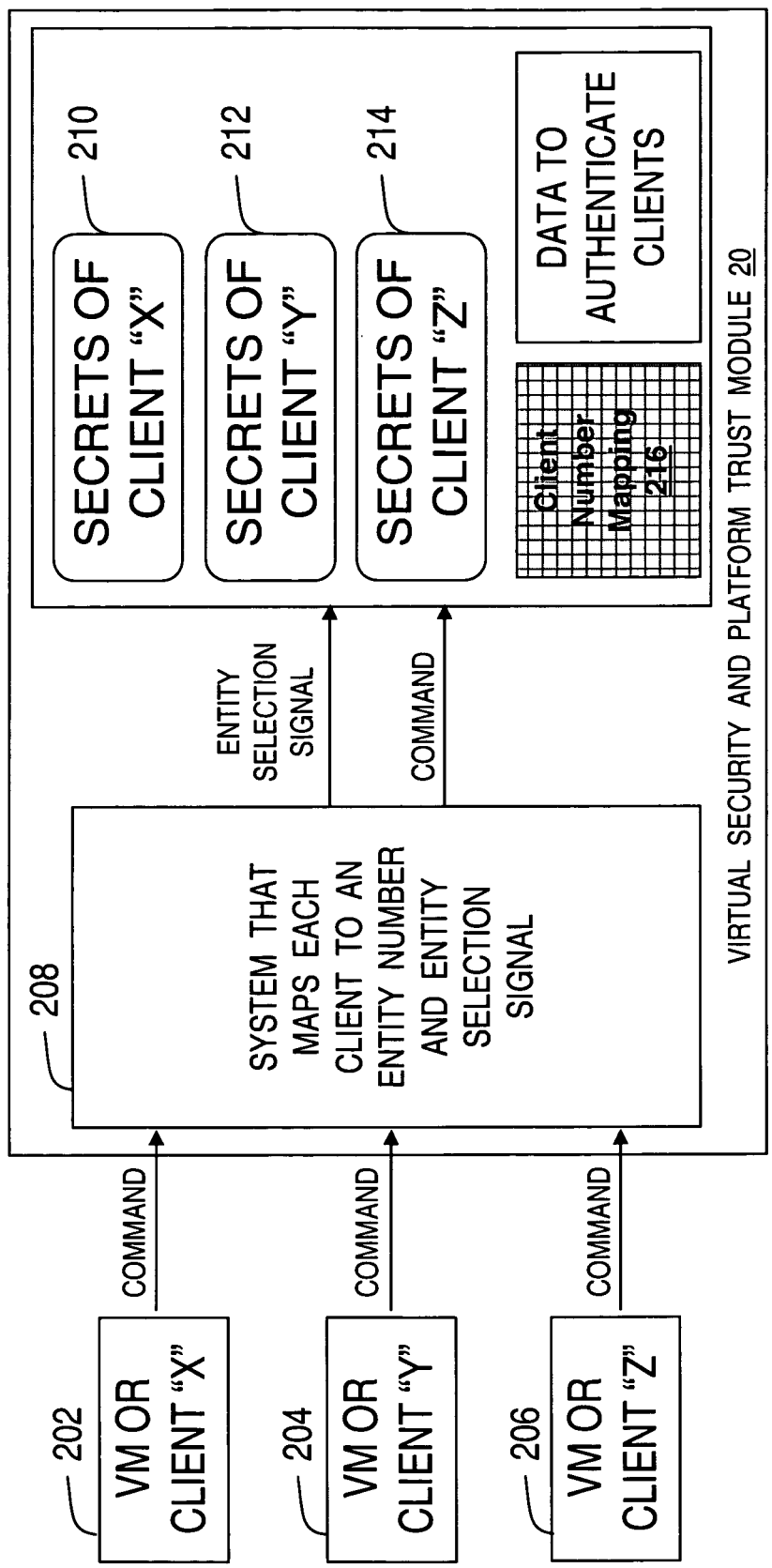
FIG. 2 is a block diagram that illustrates a mapping system to differentiate and protect client secrets in accordance with the present invention.

FIG. 2 illustrates, in accordance with the present invention, a portion of module 20 that creates an association between Virtual Machines (VMs) or Security Domains (SDs) and various sets of secrets belonging to specific clients. The VM may be a group of processing cores or processing devices that are administered with common rules and procedures on a network. Further, the VM or Domains may be software entities having resources that enable tasks to be performed.

The figure shows a mapping system 208 that maps commands issued by a client with an entity selection signal that is generated to identify that client with the commands. The commands and entity selection signal may then be passed into the configuration of the individual hardware and software components that together perform a service. Virtual machines or clients 202, 204 or 206 may issue commands into platform-specific directives for information flow and access control. For example, upon client "X" 202 issuing a command, mapping system 208 receives that command and generates an entity selection signal to clearly identify that command with client 202. The command and entity selection signal are then used to configure the protected execution environments to execute algorithms and perform calculations using only secrets assigned to client "X" 210. Other secrets such as secrets of client "Y" 212 and secrets of client "Z" 214 pertain to other clients (respectively client "Y" 204 and client "Z" 206) and are restricted and not available to the algorithms and calculations performed for client "X" 202.

Thus, device 10 is a processing system having authentication capabilities to support multiple active applications. A mapping system 208 receives commands issued by the multiple clients 202, 204 and 206, passes those commands to a processing device along with the entity selection signals that specifically identify those commands as being associated with that client. Operations may then be performed, the operations being specific to the client identified by the entity selection signal. Again, the operations for the identified client are restricted to using commands and stored data that is attached with rights previously assigned to that client. Data stored with attached rights assigned to other clients is restricted data and unavailable.

The figure shows a client number mapping block 216 that uses the entity selection signal and the commands from the client as identified by that signal to provide security and operational management for requested services. Mapping system 208 in cooperation with client number mapping 216 simplify trust management in large distributed systems by enabling flexible deployment of secure services. The collections of secrets specific to various clients are maintained and protected, with access to those secrets only granted to the specific client as identified by mapping system 208 and enabled by client number mapping 216.

Virtual security and platform trust module 20 in device 10 is designed to provide an explicit and autonomous protection of secrets reserved for a particular client prior to the processing of a service. The application developer is relieved from the burden of implementing and verifying security-related cryptographic authorization functions for every command issued for service processing. Instead of being individually specified on a per-user or per-system basis the applications or service to be run maintains the association between the virtual machines or security domains and the designated set of secrets for all subsequent commands sent to the device until the application is disassociated from those secrets.

Figure 3:
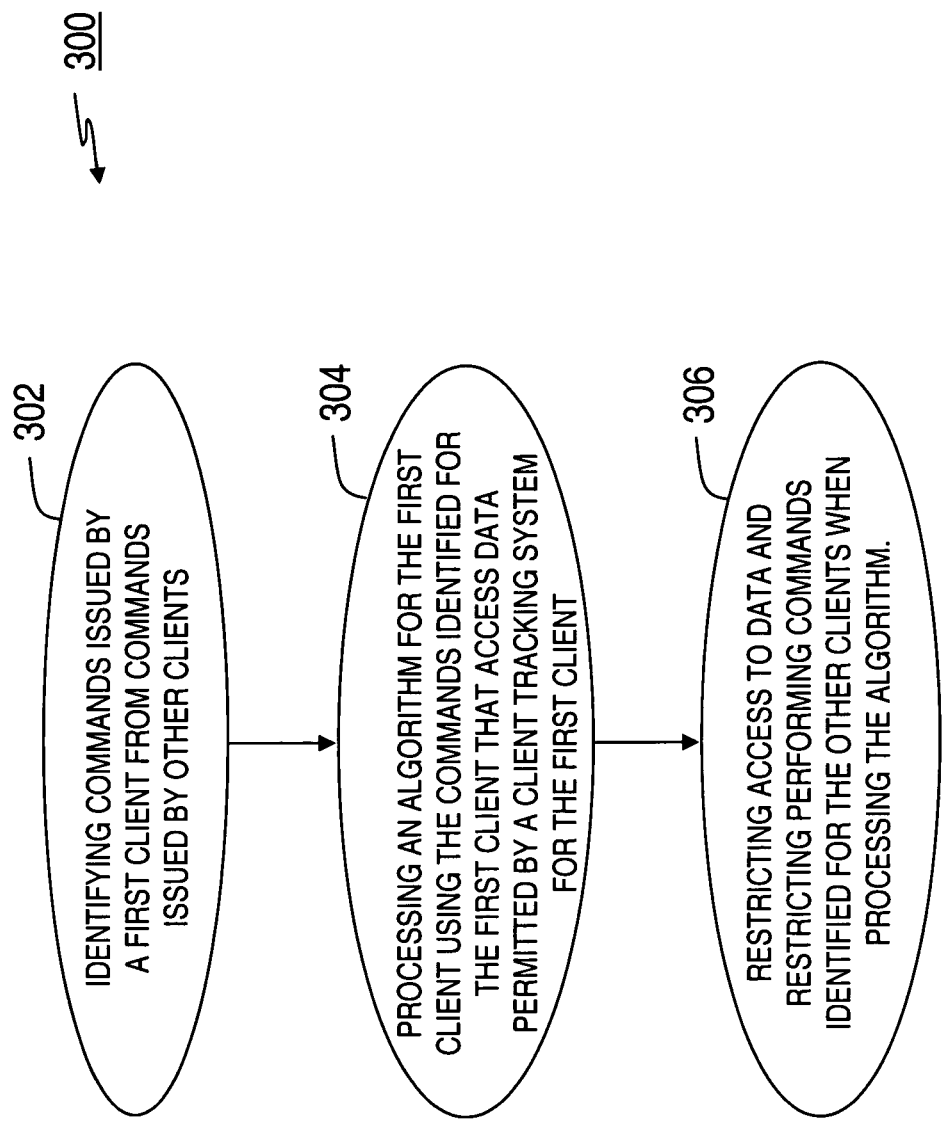
FIG. 3 is a flowchart that illustrates a method of identifying commands issued by a particular client and processing an algorithm that accesses memory data for that client in accordance with the present invention.

FIG. 3 is a flowchart that in accordance with various embodiments of the present invention illustrates a method of identifying commands issued by a particular client and processing an algorithm that accesses memory data for that client in accordance with the present invention. Thus, method 300 may be used in a computer system that supports multiple virtual machines or multiple security domains to protect secrets that applications are allowed to use. Method 300 securely maintains the association between the virtual machines or security domains and the designated set of secrets for all subsequent commands sent to the processing device until the application is disassociated from those secrets.

In some embodiments, method 300, or portions thereof, is performed by a controller, a processor, or an electronic system, embodiments of which are shown in the various figures. Method 300 is not limited by the particular type of apparatus, software element, or system performing the method. The various actions in method 300 may be performed in the order presented, or may be performed in a different order. Further, in some embodiments, some actions listed in FIG. 3 may be omitted from method 300.

Method 300 is shown beginning at block 302 in which a monitor block (such as mapping system 208 shown in FIG. 1) monitors commands issued from the multiple virtual machines or multiple security domains. Commands emanating from clients are identified as being issued by those specific clients. The method performed at block 302 generates the entity selection signal to identify the VM/SD that an application is running in and communicates that identity to the peripheral device every time a command is sent to the device. The identifier is provided to the client number mapping 216 in the device.

Block 304 shows the device processing an algorithm for the client using the commands identified for that client. Data stored in cache and in system memory may be accessed, but secrets stored in memory may only be accessed as permitted by the client tracking system (client number mapping 216, see FIG. 2). The mapping system 208 and client number mapping 216 control resources to allow secure communication from the Operating System (OS) or hypervisor to the device as to which secrets and which commands in the device the applications should be allowed to use. Block 306 shows that by maintaining the association between the VM or SD and the designated set of secrets for all subsequent commands sent to the device until the application is disassociated from those secrets, applications are prevented from using secrets that would compromise the security of the system.

In operation, hardware within the processor may include state bits that uniquely identify each VM or SD. In some processors this may be a Process Identifier (PID) or Address Space Identifier (ASID). When an application running in a VM or SD sends a command to a peripheral, the processor hardware sends signals to the peripheral informing the peripheral which VM or SD is sending the command. This signaling may be done via dedicated signals output by the processor or by encoding the information into other signals such as the address bus. The peripheral would then ensure that the commands being sent and data being used to execute those commands are appropriate to the VM or SD sending the command.

From one run to the next, the identifier associated with the VM or SD running a particular application may change, so a dynamic mapping from the SD/VM identifier to a set of secrets is provided. When a secret-using application is launched, the OS (or hypervisor) first authenticates the application checking both its integrity and its identity. Once the application is authenticated the OS then communicates to the peripheral both the VM/SD identifier and a token that unlocks the use of the set of associated stored secrets and the set of allowed operations for the application. When the application is halted or suspended the OS sends another command to the peripheral to cancel the association. The application may also end the association itself, but only the association in place for itself. The OS may include a special VM/SD identifier that the hardware uses so that only the OS may send commands to associate a VM/SD identifier with a set of secrets.

It should be pointed out that the peripheral may store a number of associations between the VM/SD and secrets simultaneously. It may further be possible for multiple VMs or SDs to be simultaneously associated with the same set of secrets. This may be the case when multiple instances of the same program are running under different VMs or SDs, and for a single VM or SD to be associated with several sets of secrets.

By now it should be apparent that circuitry and methods have been provided to support the processing of multiple active applications in a processor. Embodiments of the invention push the security down to the hardware level in conjunction with software through a mapping system that identifies commands issued by a first client from commands issued by other clients. The entity selection signal generated by the mapping system signals the processor to process an algorithm for the first client using the commands identified for the first client and data permitted by a client tracking system for the first client. Other data accesses and commands identified for other clients are restricted when processing the algorithm.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:
1. A processing system comprising:
a mapping device to receive a first command issued by a first client and a second command issued by a second client, and to generate a dedicated signal, the dedicated signal being separate from the first command and the second command, to uniquely identify the first command issued by the first client from the second command issued by the second client, the mapping device further to identify the first client based upon an Address Space Identifier (ASID); and a processing device to receive the first command, the second command, and the dedicated signal, the processing device having access to stored data for the first client and the second client where operations requested through the first command identified by the dedicated signal as being from the first client are restricted to data attached with rights previously assigned to the first client and operations requested through the second command identified by the dedicated signal as being from the second client are restricted to data attached with rights previously assigned to the second client.

2. The processing system of claim 1 wherein the mapping device to receive the first command and the second command issued by the first and the second clients is embedded with the processing device.

3. The processing system of claim 1 wherein the processing system further includes a transceiver to receive over the air signals.

4. The processing system of claim 1 wherein the data attached with rights previously assigned to the first client includes secrets reserved for the first client.

5. A method of supporting multiple active applications in a processor, the method comprising:

identifying first commands issued by a first client from other commands issued by other clients and generating an entity selection signal to identify the first commands issued by the first client, the first client being identified based upon an Address Space Identifier (ASID) and the entity selection signal being separate and distinct from the first commands and the other commands; and processing an algorithm for the first client using the entity selection signal and the first commands identified for the first client that access data permitted by a client tracking system for the first client while restricting access to data and restricting performing the other commands identified for the other clients when processing the algorithm.

6. The method of claim 5 further including using the entity selection signal to identify the first client before using the first commands in processing the algorithm.

7. The method of claim 5 wherein the processor further includes processing the multiple active applications simultaneously by differentiating the first commands from the other commands and access to data for the first client using the entity selection signal.

8. A device, comprising:

a mapping device to uniquely identify, by an entity selection signal, a first command issued by a client from other commands issued by other clients; and a tracking system to receive the entity selection signal and link the first command issued from the first client and each of the other commands issued by each of the other clients, respectively, with the entity selection signal, the entity selection signal being configured to restrict performing any commands and restrict access to data in performing operations for applications associated with the client that issued the command, the command being linked to the entity selection signal based upon an Address Space Identifier (ASID).

9. The device of claim 8 wherein the tracking system further enables access to data and commands in accordance with the entity selection signal.

10. The device of claim 8 wherein the tracking system supports the processing of multiple active applications in a processor through a mapping system that identifies and differentiates the first command issued by the client from each of the other commands issued by each of the other clients.

11. The device of claim 8 wherein the tracking system further includes mapping associations between the other clients and secrets to allow multiple clients to simultaneously associate with a same set of secrets.

12. The device of claim 8 where multiple instances of a same program are running under different virtual machines and a single virtual machine is associated with several sets of secrets.

13. A non-transitory computer readable storage medium containing instructions, which when executed by one or more processors cause at least one of the one or more processors to perform operations comprising:

identifying first commands issued by a first client from other commands issued by other clients and generating an entity selection signal to identify the first commands issued by the first client, the first client being identified based upon an Address Space Identifier (ASID) and the entity selection signal being separate and distinct from the first commands and the other commands; and processing an algorithm for the first client using the entity selection signal and the first commands identified for the first client that access data permitted by a client tracking system for the first client while restricting access to data and restricting performing the other commands identified for the other clients when processing the algorithm.

* * * * *